(12) United States Patent
Drake

(10) Patent No.: US 9,485,805 B2
(45) Date of Patent: Nov. 1, 2016

(54) NETWORK ADDRESS TRANSLATION FOR ZIGBEE™/802.15.4 BRIDGES

(71) Applicant: General Electric Company, Schenectady, NY (US)

(72) Inventor: Jeff D. Drake, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 358 days.

(21) Appl. No.: 14/024,699

(22) Filed: Sep. 12, 2013

(65) Prior Publication Data

US 2015/0074228 A1 Mar. 12, 2015

(51) Int. Cl.
*G06F 15/16* (2006.01)
*H04L 12/28* (2006.01)
*H04W 92/02* (2009.01)
*H04W 8/26* (2009.01)
*H04L 29/12* (2006.01)

(52) U.S. Cl.
CPC ............ *H04W 92/02* (2013.01); *H04L 61/106* (2013.01); *H04L 61/6081* (2013.01); *H04W 8/26* (2013.01); *H04L 61/2038* (2013.01)

(58) Field of Classification Search
CPC . H04L 12/46; H04L 12/4625; H04L 61/106; H04L 61/2038; H04L 61/6081; H04W 8/26
USPC .................................................. 709/217, 250
See application file for complete search history.

(56) References Cited

U.S. PATENT DOCUMENTS

| | | | | |
|---|---|---|---|---|
| 8,732,338 B2* | 5/2014 | Hutchison | ........... | H04L 67/2814 709/250 |
| 2004/0204086 A1 | 10/2004 | Choi et al. | | |
| 2007/0030824 A1* | 2/2007 | Ribaudo | ............... | G01S 5/0018 370/328 |
| 2007/0168551 A1* | 7/2007 | Eisink | ............... | H04L 29/12009 709/245 |
| 2008/0112420 A1* | 5/2008 | Wang | ...................... | H04L 47/10 370/401 |
| 2008/0222701 A1* | 9/2008 | Saaranen | ............ | H04L 63/0492 726/3 |
| 2012/0082062 A1* | 4/2012 | Mccormack | .......... | H04W 48/14 370/254 |
| 2013/0215902 A1* | 8/2013 | Lamb | .................... | H04L 12/462 370/401 |
| 2014/0044007 A1* | 2/2014 | Smadi | ................... | H04W 48/20 370/254 |
| 2014/0079043 A1* | 3/2014 | Montemurro | ..... | H04W 52/0216 370/338 |
| 2015/0036514 A1* | 2/2015 | Zhu | ..................... | H04W 52/244 370/252 |

FOREIGN PATENT DOCUMENTS

CN 101478505 A 7/2009

* cited by examiner

*Primary Examiner* — Viet Vu
*Assistant Examiner* — Michael A Chambers
(74) *Attorney, Agent, or Firm* — Dority & Manning, P.A.

(57) ABSTRACT

A method and device for addressing between a first device on a first network and a second device on a second network using a network bridging device, the first and second networks being physically different networks. The method includes discovering the first device on the first network, creating a virtual endpoint for the first device, storing the created virtual endpoint in a network translation table, detecting, in the network bridging device, a communication packet sent from the second network, determining if an endpoint identified in the communication packet is stored as a virtual endpoint in the network translation table, and, if so, identifying an address of the device on the second network associated with the virtual endpoint stored in the network address translation table, and transmitting the communication packet to the device address on the second network.

17 Claims, 6 Drawing Sheets

NETWORK ADDRESS TRANSLATION FOR ZIGBEE™/802.15.4 BRIDGES

BACKGROUND

1. Field of the Invention

The aspects of the present disclosure relate generally to communication networks and in particular to addressing between different ZIGBEE™ devices on different networks.

2. Description of Related Art

ZIGBEE™ is a specification for a suite of high level communication protocols using small, low power digital radios based on the IEEE 802.15.4 standard for personal area networks. The ZIGBEE™/IEEE 802.15.4 Media Access Control (MAC) standard is considered the standard for low-cost and low power short range communication networks. ZIGBEE™ gateways can be used for multiple applications where communication between ZIGBEE™ networks and IP network infrastructure is required. ZIGBEE™ type communication devices are commonly used in appliances and smart meter systems and devices that are configured to operate in home energy gateways and other similar communication networks, such as home energy management systems. Other applications can include, but are not limited to light switches, electricity meters, thermostats, alarms, remote controlled devices and sensors.

ZIGBEE™ devices can be used in different topologies. A mesh network structure can be used to transmit data over long distances, passing data through intermediate devices to reach more distant ones. The 802.15.4 standard specifies the physical layer and media access control layer for low-rate wireless personal networks.

A media access control address (MAC address) is a unique identifier assigned to network interfaces for communications on the physical network segment. MAC addresses are used for numerous network technologies and most IEEE 802 network technologies, including Ethernet. Logically, MAC addresses are used in the Media Access Control protocol sub-layer of the OSI reference model.

MAC addresses are generally pre-set by the manufacturer of a network interface card (NIC) and are stored in the hardware of the network interface card, the card's read-only memory, or some other firmware mechanism. A network node may have multiple NICs and will have one unique MAC address per NIC.

Network Address Translation is the process of modifying Internet Protocol Address Information in IP packet headers while in transit across a bridging or traffic routing device, such as a Network Address Translator (NAT).

ZIGBEE™ devices include three basic types. A ZIGBEE™ coordinator, a ZIGBEE™ router, and a ZIGBEE™ end device. The ZIGBEE™ coordinator is typically the most capable device. The ZIGBEE™ coordinator initiates the network and forms the root of the network tree. The ZIGBEE™ coordinator will be used to bridge to other networks. The ZIGBEE™ router can act as an intermediate router, passing on data from other devices. The ZIGBEE™ end device can communicate with the coordinator or router, but cannot relay data from other devices.

The use of multiple device networks at a single location or premises is relatively prevalent. For example, homes often utilize one network to provide access for devices to the Internet or a utility, and another network that allows household devices, e.g., appliances, to communicate among themselves and a centrally located device. ZIGBEE™ nodes can only send data requests to other nodes on the same network. A single ZIGBEE™ network is called a Personal Area Network (PAN).

Bridge or bridging devices allow for increasing the distance or extending the range between the nodes, bypassing walls and other obstacles. However, when an 802.15.4/ZIGBEE™ bridge device bridges two independent networks that are physically different mediums, it is generally not possible to address multiple, different devices on each side of the bridge. It would be advantageous to be able to enable ZIGBEE™ enabled devices, which are part of different physical communication networks, to be able to address and communicate with each other.

Accordingly, it would be desirable to provide a ZIGBEE™ bridge device that resolves at least some of the problems identified above.

SUMMARY OF THE INVENTION

As described herein, the exemplary embodiments overcome one or more of the above or other disadvantages known in the art.

One aspect of the present disclosure relates to a method for addressing between a first device on a first network and a second device on a second network using a network bridging device, the first and second networks being physically different networks. In one embodiment, the method includes discovering the first device on the first network, creating a virtual endpoint for the first device, storing the created virtual endpoint for the first device in a network translation table, detecting, in the network bridging device, a communication packet sent from the second network, determining if an endpoint identified in the communication packet is stored as a virtual endpoint in the network translation table, and, if so identifying an address of the device on the first network associated with that virtual endpoint stored in the network address translation table, and transmitting the communication packet to that device address.

Another aspect of the disclosed embodiments is directed to a network bridging device for addressing a first device on first network and a second device on a second network, the first network and the second network being physically different network mediums. In one embodiment the device includes a network address translation module comprising a coordinator module communicatively coupled to the first network operative to discover devices on the first network and second network. The network address translation module is operative to maintain a list of virtual endpoints for discovered devices on the second network. The coordinator module is configured to detect an incoming communication packet from the first network, determine if an endpoint number identified from the communication packet is listed in the list of virtual endpoints, and if so, determine if an address associated with the endpoint is on the second network, and if so, re-address the communication packet to the address on the second network, and send the readdressed communication packet to the second network.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION OF THE DISCLOSED EMBODIMENTS

Figure 1:
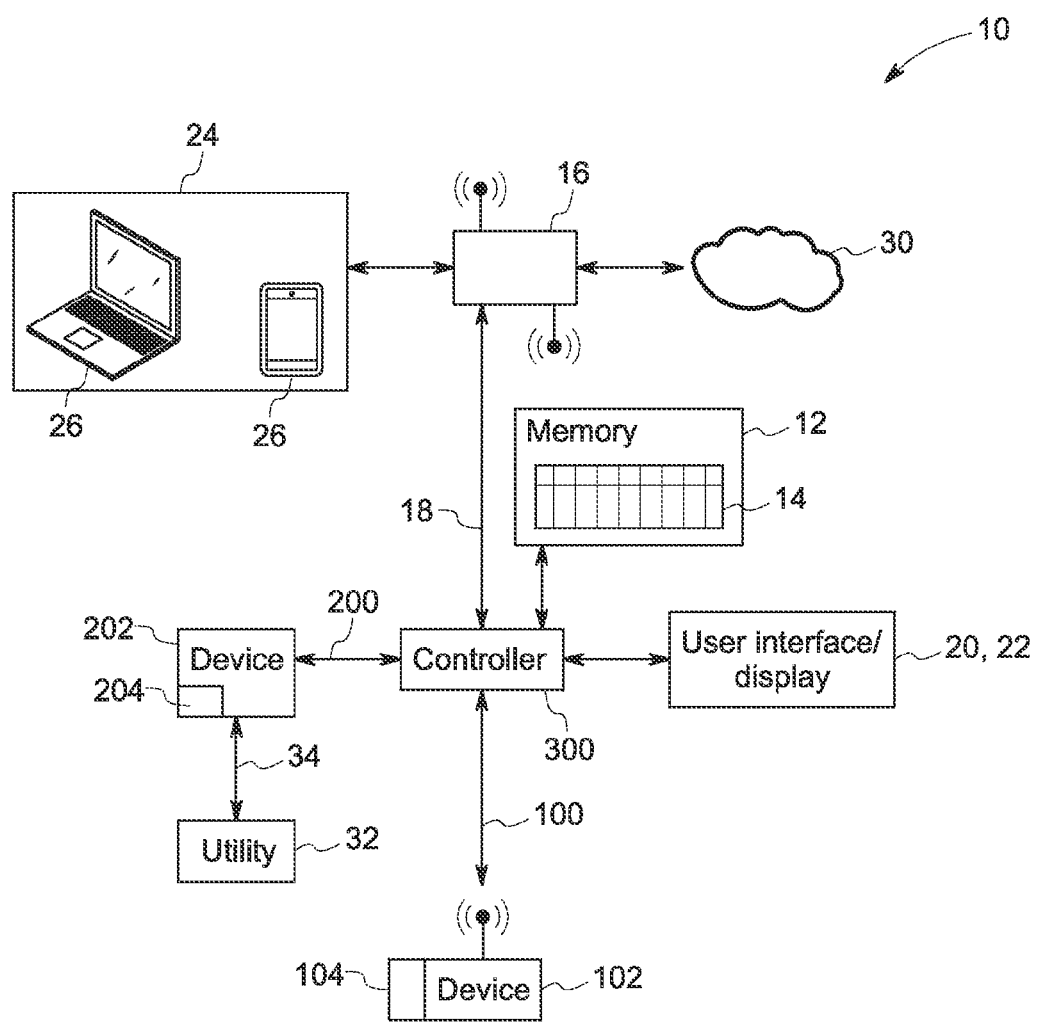
FIG. 1 illustrates a schematic block diagram of one embodiment of a system incorporating aspects of the present disclosure.

Referring to FIG. 1, one embodiment of a system incorporating aspects of the disclosed embodiments is generally indicated by reference number 10. In this example, the system 10 comprises a home energy management system. The aspects of the disclosed embodiments are generally directed to a home energy management system that includes ZIGBEE™ enabled or configured device(s), referred to herein as ZIGBEE™ devices and a ZIGBEE™ network bridge device that bridges two or more networks within the home energy management system that are physically different networks or mediums. The network bridging device acts as a gateway between two different networks, creating and storing virtual endpoints for discovered devices that allows one network to see devices on another network, which normally the one network would not see because the networks are separate networks. While the aspects of the disclosed embodiments will generally be described herein with respect to a home energy management system that incorporates ZIGBEE™ devices and a ZIGBEE™ bridge device, the aspects of the disclosed embodiments are not so limited and can include any system in which devices in different networks that form physically different mediums need to be uniquely addressed.

As shown in FIG. 1, the home energy management system 10 is configured to communicate with one or more devices, such as device 102 and device 202. The devices 102 and 202 are generally power consuming devices that are capable of having power consumption and usage monitored, as well as other aspects of their functionality, measured and controlled. Although only two devices 102, 202 are shown in FIG. 1 for illustration purposes, it will be understood that the system 10 can include any suitable number of such devices.

In one embodiment devices 102 and 202 can include, but are not limited to, a refrigerator, dishwasher, range, hot water heater, alarm, meter, light, temperature monitoring device, HVAC system, utility monitoring device or meter, or such other suitable device or appliance. For example, in one embodiment, where devices 102 and 202 are appliances, the power consumption of devices 102 and 202, as well as other operational functions, can be monitored and controlled by the system 10.

The devices 102 and 202 can also include or comprise switching devices, sensors and other monitoring devices. Examples of such sensors can include, but are not limited to, ON/OFF switches, temperature sensors, light sensors, voltage and power consumptions sensors and water flow sensors. In accordance with the aspects of the disclosed embodiments, the devices 102 and 202 are ZIGBEE™ devices and may also include or be configured with a control or communication module, such as communication modules 104 and 204 shown in FIG. 1. In one embodiment, the communication modules 104 and 204 can also include a processor or device controller.

As shown in FIG. 1, in one embodiment, the system 10 generally comprises a controller 300 for communicating with and managing appliances and devices within an environment such as a home. The controller 300 is generally configured to receive and send data and information related to monitoring and controlling the devices 102, 202 within the system 10. The controller 300 generally includes, is coupled to or is in communication with a processor that is operable to execute the methods generally described herein. In one embodiment, the controller 300 comprises machine-readable instructions that are executable by a processing device. The controller 300 can also include or be coupled to a data storage facility, such as for example a database 12 with a memory 14.

In the embodiment shown in FIG. 1, the controller 300 is communicatively coupled and operatively connected to the devices 102, 202 via one or more communication links or radios, also referred to herein as networks. The controller 300 can include or comprise a ZIGBEE™ bridge device that enables the controller 300 to facilitate communication to and between the devices 102, 202, over and across physically different networks.

As shown in FIG. 1, the controller 300 is communicatively coupled to device 102 through a first network or network connection 100. The first network 100 can include a wired and wireless communication network or connections such as a radio link between the controller 300 and device 102. Examples of such networks 100 can include, but are not limited to, an intranet, the Internet, a wide area network (WAN), a personal area network (PAN) or a wireless local area network (WLAN).

The controller 300 is communicatively coupled to the device 202 via a second network 200. The second network 200, which can also be a wired or wireless network, is a physically separate network or medium from the first network 100. Examples of such networks 200 can include, but are not limited to an intranet, the Internet, a wide area network (WAN), a personal area network (PAN) or a wireless local area network (WLAN). Although only two networks 100, 200 are shown in the example of FIG. 1, it will be understood that in alternate embodiments, the system 10 can include any suitable number of networks or network connections.

The controller 300 is configured to selectively send communication signals to one or more of the devices 102, 202 in response to input signals and communications. For example, in one embodiment, the controller 300 is configured to control the amount of power consumed by one or more of the devices 102, 202 by turning a respective device on or off, or operating the device at a discrete or continuous fraction of full power. In one embodiment, the controller 10 is a home energy gateway (HEG).

In the example of FIG. 1, the controller 300 is coupled to a router 16, which in this example is described as a home network router. The controller 300 is configured to receive communication signals via the router 16. The signals may be, for example, signals indicative of one or more energy parameters, a state of an associated energy supplying utility, or state information of the devices 102, 202 within the system 10. The communication can be carried out using any suitable communication protocols, including, but not limited to WiFi 802.11, 6LowPan/ZIGBEE™ 802.15, Ethernet 802.3, 802.11 and 802.15.4.

The controller 300 is configured to communicate via the router 16 in various communication formats, including for example, an Internet protocol using ipv6 IP addressing. As a result, devices of multiple types can communicate within the system 10.

In one embodiment, the router 16 is configured to join a ZIGBEE™ IP network or 6LowPan network as an edge router, for example. The router 16 is operable to transform the 6LowPan/ZIGBEE™ IP internet protocol address to an ipv6 address format. The router 16 can also be configured to operate as a WiFi router/access point and is able to host other WiFi devices and/or further operate as a local Ethernet router.

In one embodiment, the controller 300 can include or be coupled to an optional display 20 with a user interface 22 that may be used for displaying current energy consumption, historical energy consumption, thermostat set points and schedule, a 7-day weather forecast, or the like. The controller 300 can be configured to communicate with the router 16 via, for example an Ethernet interface 18.

In the example of FIG. 1, the controller 300 connects via Ethernet to router 16 and through router 16 to a client application 24 in a personal computer 26 and/or a mobile device 28 to access the Internet 30. Alternatively, controller 300 could be communicatively linked to router 16 by any other suitable means, for example, via WiFi. This allows for remote service and monitoring capability with the ability to communicate with devices 102, 202 across the networks 100, 200 with various different protocols (e.g., 6LowPan/ZIGBEE™, Ethernet, WiFi, etc.).

In the embodiment shown in FIG. 1, the device 202 is coupled to a utility 32. The utility 32 typically comprises an energy supplier, such as electrical energy or gas. In this example, the device 202 can comprise a utility meter that is coupled to the utility 32 via a suitable metering network or communication connection 34. In this example, the device 202 comprises one or more smart meters that are configured to communicate with the controller 300 over the communication link or network 200. The device or meter 202 in this example can be configured to output a communication signal based on electrical consumption. In another embodiment, the utility 32 can directly send the consumption data to the controller 300 via the Internet 30, rather than the meter 202.

Figure 2:
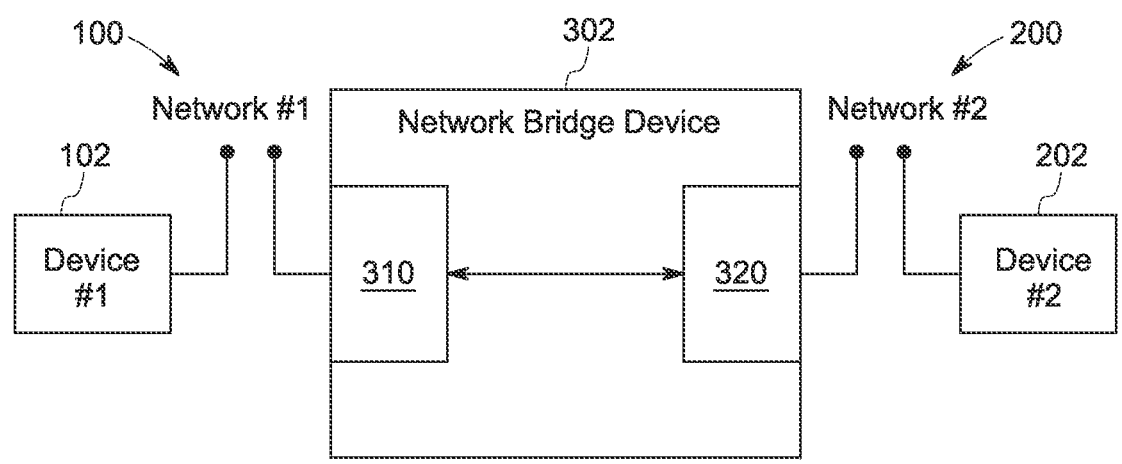
FIG. 2 illustrates a schematic block diagram of one embodiment of a ZIGBEE™ communication architecture incorporating aspects of the present disclosure.

FIG. 2 illustrates one embodiment of a network bridge device 302 that could be included in, or comprise, the controller 300 shown in FIG. 1. The network bridge device 302, also referred to as a network address translator (NAT), is configured to bridge the first network 100 and the second network 200 together, where the first network 100 and the second network 200 are physically different network mediums. Examples of the first network 100 and the second network 200 can include, but are not limited to, home automation networks, energy monitoring networks, telecommunication networks, and internet protocol applications and networks.

The network bridge device 302 is configured to translate for and between the two different networks 100, 200. For purposes of the examples herein, the network bridge device 302 will be described as translating to and between the device 102 on the first network 100 and the device 202 on the second network 200. The first network 100 will be described herein as the "non-hosted" network, that is, the network the network bridge device 302 will "join", while the second network 200 will be described as the network the network bridge device 302 will "host", that is, the "hosted" network In alternate embodiments, it will be understood that the second network 200 can be the non-hosted network, while the first network 100 is the hosted network. The network bridge device 302 shown in FIG. 2 can be part of the controller 300 illustrated in FIG. 1 or a separate device coupled thereto.

In the example of FIG. 2, the network bridge device 302 includes a first coordinator module 310 and a second coordinator module 320, also referred to herein as communication devices or radios. The first coordinator module 310 is associated with the first network 100, while the second coordinator module 320 is associated with the second network 200. Although two coordinator modules are shown in the example of FIG. 2, in one embodiment, the network bridge device 302 can comprise a single coordinator module or radio that is configured to communicate with the different networks 100, 200.

As shown in FIG. 2, the first coordinator module 310 is configured to communicate with device 102 over first network 100, while the second coordinator module 320 is configured to communicate with device 202 over the second network 200. The devices 102, 202 shown in FIG. 2 are, or are configured as, ZIGBEE™ 802.15.4 devices. Both the first and second coordinator modules 310, 320 operate as interfaces or communication modules. The first coordinator module 310 facilitates communication to and from device 102 and the network bridge device 302, and the second coordinator module 320 facilitates communication to and from device 202 and the network bridge device 302.

The network bridging device 302 of the disclosed embodiments provides network address translation to enable devices 102, 202 to communicate with each other while on separate physical networks 100, 200. The network bridging device 302 acts as a gateway to create and store virtual endpoints for discovered devices on the networks 100, 200 to allow one network to see devices on the other network that normally the one network would not see because the networks are separate networks. In one embodiment, the coordinator modules 310, 320 can be described or configured as ZIGBEE™ coordinator devices. The network bridging device 302 is configured to keep up with the communication and data traffic that travels between first network 100 and second network 200, and devices 102 and 202.

Figure 3:
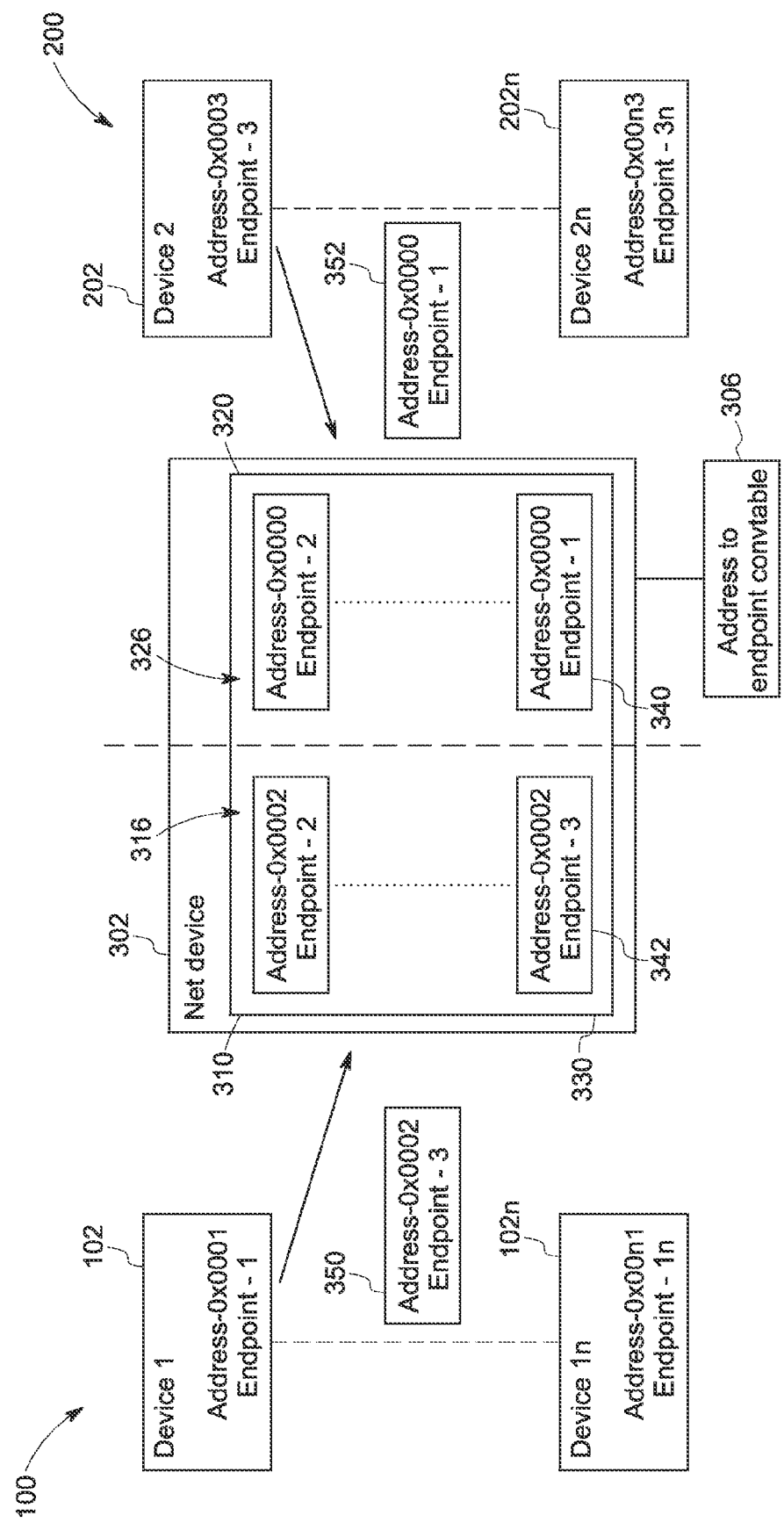
FIG. 3 illustrates a block diagram of one embodiment of an addressing architecture in a ZIGBEE™ communication system incorporating aspects of the disclosed embodiments.

In one embodiment, referring to FIGS. 2 and 3, the device 102 on first network 100 is attempting to address device 202 on the second network 200, where the device 202 on the second network 200 is not a network bridging device. In this example, network bridging device 302 includes a module 330 which maintains a list 316 of devices, 102 to 102n on the first network 100, and a list 326 of devices 202-202n on the second network 200 discovered by coordinator modules 310 and 320 respectively. The devices 102 to 102n and 202 to 202n will be associated with different endpoint numbers that are stored in the lists 316, 326. In one embodiment, the lists 316, 326, also referred to herein as tables, are generally part of a network address translation table 330. In the example of FIG. 3, the network bridging device 302 includes two lists or tables 316, 326, one for each network 100, 200, respectively.

In one embodiment, the network address translation module 330 actively maintains and stores lists 316 and 326 in the memory 14 shown in FIG. 1.

The network bridging device 302 enables the devices 102, 202 to address information across the network bridging device 302 by creating virtual endpoints in the tables 316 for the devices in network 200 and including them as virtual endpoints in the list 316 for the devices in network 100, and vice versa. The virtual endpoint information will mirror the endpoint information available on devices 102, 202 on the particular network 100, 200, respectively. In this example, the network bridge device 302 will enable device(s) 202 to 202n on the second network 200 to address device(s) 102 to 102n on first network 200 by discovering and representing all devices 102 to 102n as separate virtual endpoints in list 326 for devices on the second network 200. The network bridging device 302 will maintain an address to endpoint conversion table 306 which maps and records the association between virtual endpoint numbers and the address/endpoint number of the actual devices.

Referring to FIG. 3, in this example, device 102 on first network 100 has an assigned network address 0x0001 and endpoint number 1, while device 202 on second network 200 has an assigned network address 0x0003 and endpoint 3. The assigned network address is assigned when the device joins the network. The endpoint values are generally pre-set by the manufacturer of the device and are stored in the hardware of the device, a memory, or some other firmware mechanism. In one embodiment, the coordinator modules 310, 320 of the network bridge device 302 discover the respective devices 102, 202 on each network and mirror the endpoint values into the tables 316, 326. More specifically, when the devices 102 are discovered by coordinator 310 of the network bridge device 302, the actual endpoint values for devices 102 are mirrored into list 316 as actual endpoints and are mirrored into the table, 326 as virtual endpoints. Similarly when the devices 202 on network 200 are discovered by coordinator 320, the actual endpoints values for devices 202 are mirrored into list 326 as actual endpoints and are mirrored into the list 316 as virtual endpoints.

The coordinator module 310 can maintain a list 316 with as many new endpoints as there are devices 102 to 102n on network 100 and as many new virtual endpoints as there are devices 202 to 202n on network 200. The list 316 will always have the same address. The endpoints will be different. Similarly, coordinator module 320, being the same physical device, will always have the same address, but new endpoints to represent the different devices 202 to 202n and new virtual endpoints to represent the different devices 102-102n on network 100. The network address translation module 330 maintains the endpoint translation relationships between endpoint numbers and address/endpoint numbers of the actual device In one embodiment, a table 306 maps virtual endpoints to physical device addresses for the devices 102, 202.

In the example shown in FIG. 3, when Device 1 on network 100 is discovered by coordinator 310, it is assigned a network address 0x0001 which is recorded together with its factory assigned endpoint which is read by coordinator 310 and represented in the example for simplicity as the number 1. This endpoint is added to the list 316 together with address 0x0002 which is the address of coordinator 310. This endpoint is also mirrored into list 326 (entry 340) as virtual endpoint 1 together with address 0x0000 which is the address of coordinator 312, Conversion Table 306 is also updated to record the association of the actual network address of the device with the virtual endpoint. In this manner, the devices 102-102n are discovered and represented in list 316 with device address 0x0002 and actual factory assigned endpoint and mirrored in list 326 with device address 0x0002 and the same endpoint number. The device 202, when discovered by coordinator 320 will be assigned a network address of 0x0003 and retain its actual endpoint represented as endpoint 3, and will be represented in list 326 with address 0x0000 and endpoint 3 and mirrored into list 316 of the table 330 as address 0x0002 and virtual endpoint 3 (entry 342). Conversion Table 306 is also updated to record the association of the assigned network address of the device associated with the endpoint.

When the device 102 on the first network 100, with address 0x0001, would like to address the device 202 on the second network 200 with address 0x0003, an individual packet 350 from device 102 will be addressed to the coordinator module 310, with address 0x0002 and the endpoint of the device 202 at the network level. At the application level, the coordinator module 310 will recognize the endpoint as the virtual endpoint number that was created for the device on network 200.

When the coordinator module 310 receives this packet 350 from device 102, destined for device 202, and recognizes that the destination endpoint 3 corresponds to that designated for a device address 0x0002 with virtual endpoint 3 in table 316 and therefore addressed to a device outside of network 100, the coordinator module 310 initiates the re-addressing of the packet. Bridging device 302 determines that the assigned network address for the device associated with endpoint 3 is in network 200, using the conversion table 306, and the packet is re-addressed accordingly and delivered to coordinator 320 which processes the packet for delivery to the appropriate device on network 200.

As another example, when device 202 on network 200 with address 0x0003 attempts to address device 102 on network 100 with address 0x0001 and endpoint 1, the device 202 on network 200 will only know of this device 102 by its endpoint number. The individual packet 352 that is sent from the device 202 will be addressed to the coordinator module 320 at the network level with device address 0x0000 with the endpoint 1. At the application level, the coordinator module 320 will recognized endpoint 1 as a virtual endpoint and will initiate the process of readdressing the packet 352. The assigned network address for endpoint 1 will be determined from conversion table 306 and the packet will be delivered to the device associated with endpoint 1 on network 100 by coordinator 310.

Figure 4:
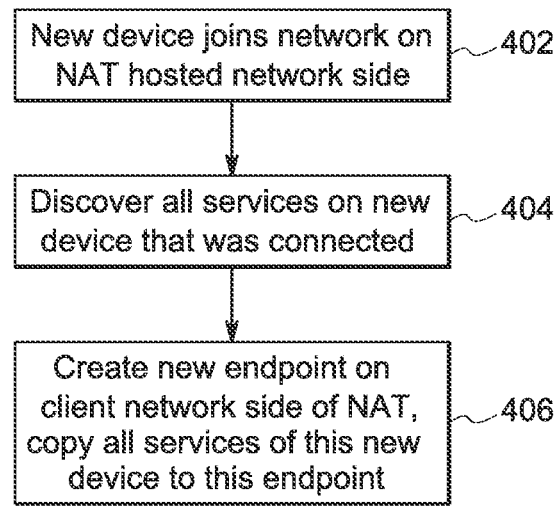
FIG. 4 illustrates a flowchart of one embodiment of a device joining process in a ZIGBEE™ communication system incorporating aspects of the disclosed embodiments.

FIG. 4 is a flowchart illustrating one embodiment of a process enabling a device 202 to join the second communication network 200 shown in FIGS. 1 and 2. In this embodiment, the device 202 joins 402 the second network 200, which in this embodiment is the side that is hosted by the network bridge device 302. In alternate embodiments the first network 100 could be the hosted side. The network bridge device 302 discovers 404 all of the services on the device 202 that were connected. A service is an application level feature that a device may support. For example, a light switch may support a service to turn the light ON and OFF. A refrigerator may support a service to read a freezer. The aspects of the disclosed embodiments are intended to encompass all such services. After the network bridge device 302 discovers 404 the services on the device 202, the network bridge device 302 creates 406 a new virtual endpoint on the joined or "client network side", of the network bridge device 302, which in the embodiment in FIGS. 2-3 is the network 100 coordinated by coordinator module 310, and copies all services associated with the device 202 to this endpoint. For purposes of this example, the virtual endpoint number that is created for the discovered device 202 is stored in the list 316. Thus, as is shown in FIG. 3, for device 202 the virtual endpoint entry 342 includes address 0x0002 and endpoint-3.

Figure 5:
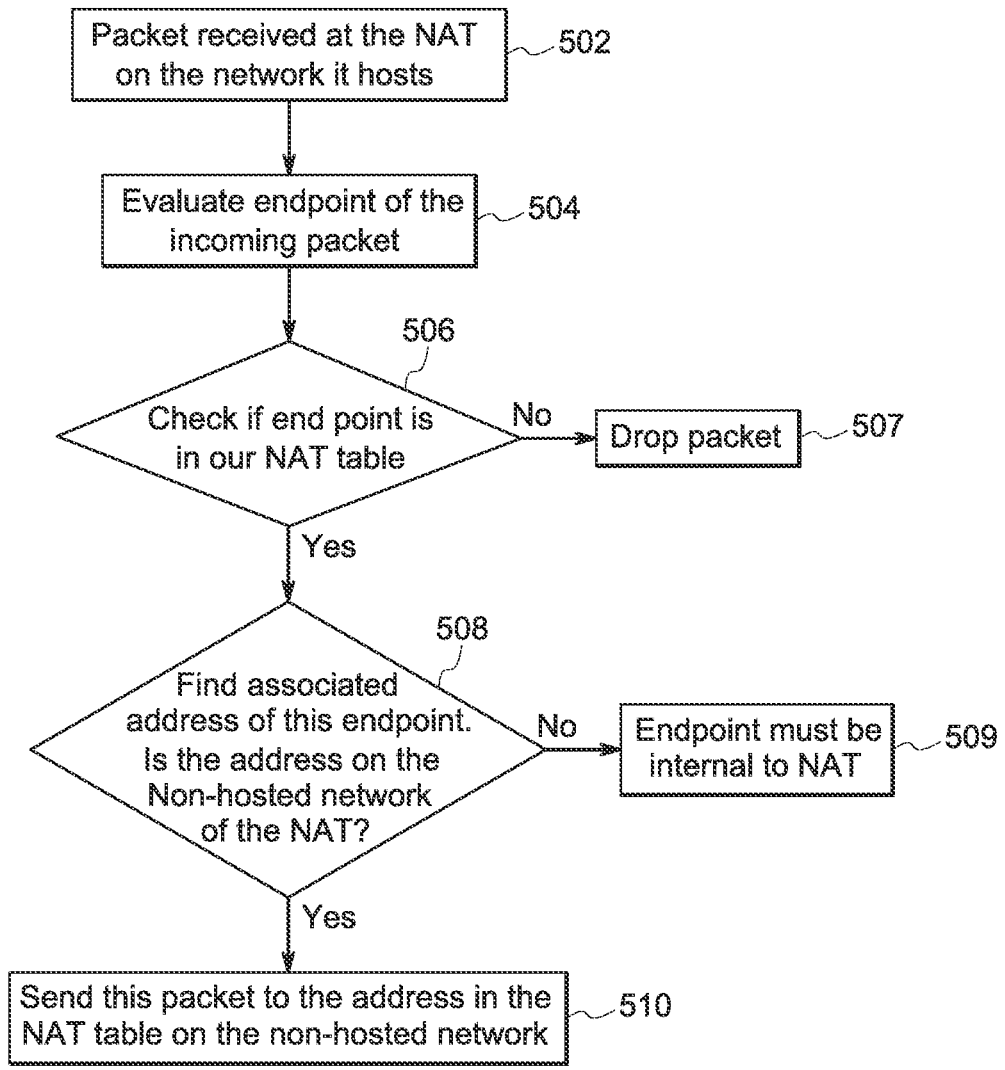
FIG. 5 illustrates a flowchart of one embodiment of a packet process flow in a ZIGBEE™ communication system incorporating aspects of the disclosed embodiments.

FIG. 5 is a flow chart illustrating one embodiment of processing a packet, such as packet 352 shown in FIG. 3, received on the hosted side (network 200) of the network bridge device 302. In this embodiment, the packet 352 is received 502 by the network bridge device 302 from device 202 on the network 200. The network bridge device 302 evaluates 504 the endpoint of the incoming packet 352, which in this example is endpoint 1, and determines 506 if the endpoint 1 is in the translation table list 326. In this example, the endpoint 1 is found as a virtual endpoint in the list 326 (entry 340). The sending device 202 in this example only knows of the device or coordinator module 320 with an address of 0x0000, and that that this coordinator module 320 has many different endpoints. The sending device 202 in this example does not actually know if the packet 352 will go anywhere else other than the coordinator module 320. Only the network bridge device 302 knows whether this packet 352 will go beyond the coordinator module 320 with address 0x0000. If the endpoint is not in the translation table list 326, the packet is dropped 507.

If the endpoint in the incoming packet 352 from device 202 is in the translation table list 326 of the network bridge device 302, the address associated with the endpoint is identified 506. Table 306 is used to map the endpoint to a physical device address. In this example, the address associated with the endpoint 1 is 0x0001. It is determined 508 whether the identified address is on the non-hosted side, in this example the first network 100 side, of the network bridge device 302. If the identified address is not found 509 on the first network side 200, the endpoint must be internal to the network bridge device 302, so no change to the address is made by bridge device 302.

The network bridge device 302 will take the endpoint and if it is recognized, map the endpoint to a physical address on network 100 using address to endpoint conversion table 306. The packet 352 will then be sent to the device with that physical address determined using table 306. In this example, the identified address is on the first network side 100 and the packet 352 is sent 510 to the identified address 0x0001 on the first network side 100.

Figure 6:
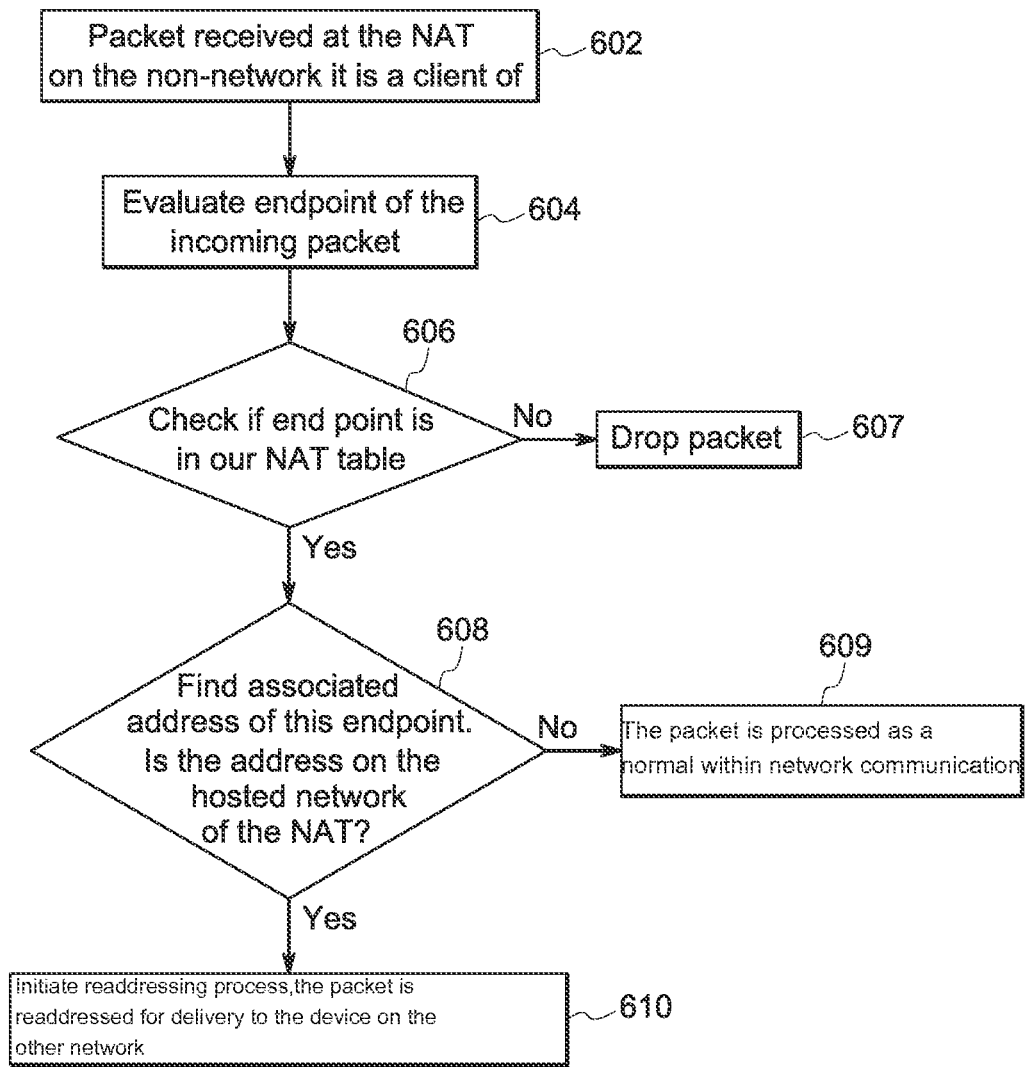
FIG. 6 illustrates a flowchart of another embodiment of a packet process flow in a ZIGBEE™ communication system incorporating aspects of the disclosed embodiments.

FIG. 6 is a flowchart illustrating one embodiment of processing an incoming packet 350 from the non-hosted (network 100) side of a network bridge device 302 incorporating aspects of the present disclosure. In this example, the packet 350 sent from device 102 is received 602 by coordinator 310 of the network bridge device 302 on the first network 100 or non-hosted side of the network bridge device 302. The network bridge device 302 evaluates the packet 350 to determine 604 the endpoint identified in the packet 350. The network bridge device 302 determines 606 if the endpoint is in the translation table list 316 maintained by module 330 of the network bridge device 302. If the identified endpoint is not found, the packet is dropped 607. If the identified endpoint is listed in the list 316, it is determined 608 whether the address associated with the endpoint is a virtual endpoint representing a device on the second network 200 or an actual endpoint representing a device on the hosted side of the network bridge device 302. In this example, endpoint 3 appears on list 316 as a virtual endpoint, so the process of readdressing the packet 352 is initiated. The assigned network address for endpoint 3 is determined from conversion table 306 and the packet is delivered to the device associated with endpoint 3 on network 200 by coordinator 320.

In the forgoing embodiments, module 330 maintains list 316 of actual endpoints for devices physically present on network 100 and virtual endpoints for devices on network 200, and list 326 of actual endpoints for devices physically present on network 200 and virtual endpoints for devices on network 100. In another embodiment, each list may include only the virtual endpoints for devices physically on the other network. In such an embodiment, when the coordinator device receives a packet from a device on its network, it checks the virtual endpoint list. If the endpoint for the packet is on the list of virtual endpoints, the readdressing process is initiated 610 and the packet is readdressed as above described for delivery to the device on the other network. If the endpoint is not on the list, no readdressing is necessary and the packet is processed 609 as a normal within network communication.

The processing of the disclosed methods and systems can be performed by software components. The disclosed systems and methods can be described in the general context of computer-executable instructions, such as program modules, being executed by one or more computers or other devices. Generally, program modules, such as the controller 300 described herein, comprise computer code, routines, programs, objects, components, data structures, etc. that perform particular tasks or implement particular abstract data types. The disclosed methods can also be practiced in distributed computing environments where tasks are performed by remote processing devices that are linked through a communications network. In a distributed computing environment, program modules can be located in both local and remote computer storage media including memory storage devices.

The controller 300 can typically comprise or include a variety of computer readable media. Exemplary readable media can be any available media that is non-transitory and accessible by the controller 300 and comprises, for example and not meant to be limiting, both volatile and non-volatile media, removable and non-removable media. The memory 14 comprises computer readable media in the form of volatile memory, such as random access memory (RAM), and/or non-volatile memory, such as read only memory (ROM). In one aspect, the memory 14 contains computer executable codes sections for performing the steps described herein. The system 10 can also include a computer program product including non-transitory computer readable program code means, the non-transitory computer readable code means, when executed by a processor device being configured to carry out the processes and methods described herein.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit and scope of the invention. Moreover, it is expressly intended that all combinations of those elements and/or method steps, which perform substantially the same function in substantially the same way to achieve the same results, are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for addressing between a first device on a first network and a second device on a second network using a network bridging device, the first and second networks being physically different networks, comprising:
   discovering the first device on the first network;
   creating a virtual endpoint for the first device based at least in part on a predetermined actual endpoint of the first device;
   storing the actual endpoint of the first device in a first portion of a network translation table associated with the first network, and storing the created virtual endpoint for the first device in a second portion of the network translation table associated with the second network;
   detecting, in the network bridging device, a communication packet sent from the second network;
   determining if an endpoint identified in the communication packet is stored as a virtual endpoint in the network translation table; and, if so
   identifying an address of the device on the first network associated with the virtual endpoint stored in the network address translation table; and
   transmitting the communication packet to the device address associated with the endpoint on the first network.

2. The method of claim 1, comprising discovering a second device on the second network, creating a virtual endpoint for the second device and storing the created virtual endpoint for the second device in the network translation table.

3. The method of claim 1, wherein the first device and the second device are ZIGBEE™ devices.

4. The method of claim 1, comprising maintaining a list of devices discovered on the first network in the network address translation table and a list of devices discovered on the second network in the network address translation table, the list of devices on the first network having a common address and different endpoints and the list of devices on the second network having a common address and different endpoints.

5. The method of claim 1, comprising mapping a virtual endpoint to a physical device address using an endpoint conversion table.

6. A network bridging device for addressing a first device on first network and a second device on a second network, the first network and the second network being physically different networks, comprising:
   a network address translation module comprising a coordinator module communicatively coupled to the first network operative to discover devices on the first network and second network; and
   wherein the network address translation module is operative to maintain a first list of predetermined actual endpoints representing discovered devices on the first network and a second list of created virtual endpoints representing discovered devices on the second network; and
   wherein the coordinator module is configured to:
      detect an incoming communication packet from the first network;
      determine if an endpoint number identified from the communication packet is listed in the its list of virtual endpoints; and if so,
      determine if an address associated with the endpoint number is on the second network; and if so,
      re-address the communication packet to the address of the discovered device on the second network; and
      send the re-addressed communication packet to the second network.

7. The network bridging device of claim 6, wherein the first device and the second device comprise ZIGBEE devices.

8. The network bridging device of claim 6, wherein the coordinator module is configured to discover the first device on the first network, copy services associated with the first device to an entry in the network address translation module list for the first device and assign a virtual endpoint to the entry for the first device.

9. The network bridging device of claim 6, wherein the coordinator module includes a first coordinator module for discovering devices on the first network and a second coordinator module for discovering devices on the second network, the first coordinator module maintaining a list of devices discovered on the first network, wherein each entry in the list shares a common address and a different endpoint, and the second coordinator module maintaining a list of devices discovered on the second network, wherein each entry in the list shares a common address and a different endpoint.

10. The network bridge device of claim 6, wherein the first coordinator module and the second coordinator module comprise radio devices.

11. The network bridge device of claim 6, comprising a translation table that maps a physical device address to an endpoint, the coordinator module being operative to retrieve address information from the translation table to re-address the communication packet to the address on the second network; and send the re-addressed communication packet to the second network.

12. A computer program product stored in a memory, comprising:
   non-transitory computer readable code means, the non-transitory computer readable code means when executed by a processor device being configured to:
   discover the first device on the first network;
   create a virtual endpoint for the first device based at least in part on a predetermined actual endpoint of the first device;
   store the actual endpoint of the first device in a first portion of a network translation table associated with the first network, and store the created virtual endpoint for the first device in a second portion of the network translation table associated with a second network;
   detect, in the network bridging device, a communication packet sent from the second network to the first network;
   determine if an endpoint identified in the communication packet is stored in the network translation table; and, if so
   identify an address of the device on the first network associated with the endpoint stored in the network address translation table; and
   transmit the communication packet to the device address associated with the endpoint on the first network.

13. The computer program product of claim 12, further comprising non-transitory computer readable code means for discovering a second device on the second network, creating a virtual endpoint for the second device and storing the created virtual endpoint for the second device in the network translation table.

14. The computer program product of claim 12, further comprising non-transitory computer readable code means for maintaining a list of devices discovered on the first network in the network address translation table and a list of devices discovered on the second network in the network address translation table, the list of devices on the first network having a common address and different endpoints and the list of devices on the second network having a common address and different endpoints.

15. The computer program product of claim 12, further comprising non-transitory computer readable code means for mapping a physical device address to an endpoint and storing the mapping in the network address translation table.

16. A network bridging device for addressing a first device on first network and a second device on a second network, the first network and the second network being physically different networks, comprising:
 a network address translation module comprising
 a first coordinator module associated by communicative coupling with the first network; and a second coordinator module associated by communicative coupling to the second network;
 wherein each coordinator module is configured to:
  maintain a first list of actual endpoints representing discovered devices on the associated network, and a second list of virtual endpoints representing discovered devices on the non-associated network,
  detect an incoming communication packet from its associated network;
  determine if an endpoint number identified to receive the communication packet is listed in its list of virtual endpoints; and if so,
  to initiate the re-addressing of the communication packet to the address of the discovered device on the non-associated network associated with that virtual endpoint.

17. The networking bridging device of claim 16 wherein the network address translation module further comprises an address to endpoint conversion table that associates each virtual endpoint with the network address of the discovered device represented by the endpoint, and wherein the network address translation module is operative to readdress the packet using the address associated with the virtual endpoint in the address to endpoint conversion table.

* * * * *